United States Patent [19]

Layden et al.

[11] 4,080,413

[45] Mar. 21, 1978

[54] POROUS CARBON FUEL CELL SUBSTRATES AND METHOD OF MANUFACTURE

[75] Inventors: George K. Layden, East Hartford; Roscoe A. Pike, Simsbury; Michael A. DeCrescente, Wethersfield, all of Conn.

[73] Assignee: United Technologies Corporation, Hartford, Conn.

[21] Appl. No.: 640,467

[22] Filed: Dec. 15, 1975

[51] Int. Cl.$^2$ ............................................. D21H 1/48
[52] U.S. Cl. .................... 264/29.2; 162/138; 162/146; 162/157 R; 264/29.7; 264/43; 264/91; 423/447.6; 423/447.7; 428/280
[58] Field of Search .............................. 264/29.1–29.7, 264/43–44, 91; 423/447.6, 447.7; 136/120 FC; 162/138, 157 R, 146; 428/280; 427/115, 228

[56] References Cited

U.S. PATENT DOCUMENTS

| | | | |
|---|---|---|---|
| 3,265,557 | 8/1966 | De Fries | 162/146 |
| 3,367,812 | 2/1968 | Watts | 264/29.5 |
| 3,619,139 | 11/1971 | Dixon et al. | 423/447.7 |
| 3,639,266 | 2/1972 | Battista | 264/29.6 |
| 3,671,192 | 6/1972 | Ezekiel | 423/447.6 |
| 3,700,511 | 10/1972 | Whitney et al. | 423/447.6 |
| 3,728,423 | 4/1973 | Shaffer | 264/29.5 |
| 3,818,082 | 6/1974 | Burns et al. | 139/420 R |
| 3,829,327 | 8/1974 | Omori et al. | 136/120 FC |
| 3,971,669 | 7/1976 | Wrzesien et al. | 264/29.2 |
| 3,998,689 | 12/1976 | Kitago et al. | 427/228 |
| 4,002,426 | 1/1977 | Chenevey et al. | 264/29.2 |

*Primary Examiner*—Jeffery R. Thurlow

[57] ABSTRACT

Porous carbon sheets suitable for use as fuel cell electrode support plates are produced by stabilizing acrylic filament precursors through the controlled addition of oxygen thereto. The stabilized filaments are thereafter chopped into short lengths, felted and pressed into sheets with the pressing step being performed at a temperature determined by the oxygen content of the stabilized filaments. The sheets are thereafter pyrolyzed to produce the desired porous substrate material.

13 Claims, No Drawings

POROUS CARBON FUEL CELL SUBSTRATES AND METHOD OF MANUFACTURE

BACKGROUND OF THE INVENTION

1. Field of the Invention

The present invention relates to the production of porous carbon structures and particularly to the manufacture of articles comprised of binderless, single phase, bulk carbon having a fibrillar microstructure. More specifically, this invention is directed to fibrillar carbon fuel cell electrode substrates. Accordingly, the general objects of the present invention are to provide novel and improved methods and articles of such character.

2. Description of the Prior Art

While not limited thereto in its utility, the present invention is particularly well suited to the production of carbon or graphite "paper." Such carbon "paper" has been employed as electrode support plates and could be substituted for present porous sintered nickle electrolyte reservoir plates in fuel cells. For a fuel cell application, carbon "paper" must, in addition to being cost effective, meet rather stringent chemical, physical and electrical property requirements. Thus, by way of example, material suitable for use in a fuel cell as an electrode support plate or an electrolyte reservoir plate must be characterized by a high resistance to oxidation, availability in thickness in the range of 15-20 mils and be susceptible to handling; i.e., not fragile. Also, such material must have a high degree of porosity and have a lateral resistivity which lies within a narrow predetermined range. As an example of utilization of a porous sheet material in the fuel cell technology, such material may be employed as electrolyte reservoir plates. An electrolyte reservoir plate in a fuel cell will contain excess KOH solution within its pores, which have an average pore size in the range of 3-8$\mu$, and will serve to assure that the maximum amount of the electrolyte communicates with the cell. The electrolyte reservoir plate is also the media through which the product water produced in the fuel cell is removed. In addition to being lightweight, having high pore volume and KOH compatability, the electrolyte reservoir plate material must be easily wet and contain a narrow pore size distribution to facilitate delivery of electrolyte from its structure to the cell matrix on demand. In an acid electrolyte fuel cell, carbon "paper," having an average pore size in the range of 15-30$\mu$, presently functions as support plates to hold the active catalyst of the fuel cells.

The conventional prior art manner of forming porous carbon structures suitable for use as fuel cell catalyst support plates consists of forming chopped carbon fibers into paper-like structures and subsequently bonding the fibers together by chemical vapor deposition of a carbon binder phase. Alternately, porous carbon "paper," may be fabricated by bonding the chopped carbon fibers together with a polymer resin which is subsequently pyrolyzed to form a carbon binder. These prior art techniques are inherently slow and costly. A primary contributing factor to the high cost of the prior art techniques resides in the use of exceedingly expensive graphite or carbon fibers as the starting material. The use of graphite or carbon fibers as the starting material dictates that the production of the porous carbon "paper" include two graphitization steps; i.e., graphitization to produce the starting fiber and then a further pyrolyzation step to convert the binder material to carbon.

It has recently been discovered that binderless, single phase bulk carbon or graphite articles having a fibrillar microstructure can be produced through stabilizing certain polymer fibers by a heating step, which introduces a selected amount by weight of oxygen into the polymer, and thereafter subjecting short lengths of the stabilized fiber to a temperature and pressure sufficient to cause heat distortion flow and concomitant self-bonding of contiguous fibers. Thereafter the bonded structure is pyrolyzed by heating in a nonoxidizing atmosphere. A complete discussion of the above briefly described technique, as well as detailed discussion of the previous state of the art, may be found in copending U.S. patent application Ser. No. 661,211 of George K. Layden, Romeo G. Bourdeau and Roscoe A. Pike; application Ser. No. 661,211 being a continuation of application Ser. No. 481,438, now abandoned, filed June 20, 1974. The disclosure of application Ser. No. 661,211 is incorporated herein by reference. The technique of referenced application Ser. No. 661,211, if adapted to the production of porous carbon "paper" suitable for fuel cell applications, would substantially reduce the cost of such "paper" through elimination of the need to use expensive carbon fibers and through elimination of the use of a polymer resin binder or a chemical vapor deposited carbon binder phase.

SUMMARY OF THE INVENTION

The present invention overcomes the above briefly discussed and other deficiencies and disadvantages of the prior art by providing a novel and improved technique for the production of rigid porous felted carbon structures and by providing comparatively inexpensive fuel cell support and reservoir plates through the practice of such novel technique.

In accordance with the present invention acrylic filaments are subjected to an oxidation treatment which alters the polymer chemistry so as to stabilize the filaments by rendering them non-melting. The oxidation treatment is controlled in such a manner that the oxidized acrylic filaments retain some thermoplasticity while containing 3 to 10% by weight of oxygen. The stabilized acrylic filaments are reduced to fibers of short length and the chopped fibers are "felted"; i.e., the randomly oriented fibers are caused to be uniformly distributed on a planar support. A thin layer of "felted" fibers is placed on a surface of a mold and the mold is thereafter placed between the platens of a preheated press to produce pressed sheets; the sheets resulting from heat distortion flow and self-bonding of continuous fibers. Thereafter, the sheets are subjected to pyrolysis by heating in a non-oxidizing atmosphere to produce the desired porous end product.

DESCRIPTION OF THE PREFERRED EMBODIMENT

In accordance with the present invention, self-bonded fibrillar carbon "paper" having a porosity in the range of 50-70% is prepared employing an acrylic filament precursor; the precursor being a filament formed of acrylonitrile polymers including homopolymers, copolymers, terpolymers, graft polymers and the like containing at least 50% acrylonitrile and preferably at least 80% acrylonitrile.

The first step in the practice of the invention, subsequent to selection of the acrylic filament, the diameter of the selected filament being in part determinative of the pore size in the end product, consists of stabilizing a yarn comprised of the acrylic filament by subjecting it to an oxidation treatment which alters the polymer chemistry so as to render the constituent filaments non-melting. This oxidation treatment will typically comprise passing the yarn through a forced draft muffle maintained at a temperature of 215° C. The passage of the yarn through the muffle is regulated so that the yarn has a total residence of time at temperature commensurate with the amount by weight of oxygen it is desired to introduce into the polymer. The usable range of oxygen content is 3 to 10% with the preferred range being 4 to 8%. Maintaining the yarn at the processing temperature of 215° C for a time of four hours will, for example, introduce 9 to 10% by weight oxygen into the polymer. Shorter residence times give lower oxygen content.

Subsequent to stabilization, the yarn is mechanically "chopped" into fibers having the desired length. The chopping step may, for example, be performed in a pulverizing mill having openings commensurate with the desired porosity of the end product. Restated, the porosity of the end product is in part controlled by the average length of the individual fibers.

Subsequent to preparation of the chopped, stabilized acrylic fiber, sheets of porous carbon "paper" having the desired thickness and external dimensions are prepared by felting the chopped fiber, molding the felt under heat and pressure to produce "paper" and carbonizing the molded paper in an inert atmosphere to achieve the desired combination of porosity, resistivity and corrosion or acid resistance.

The felting of the chopped fibers may be performed by any one of several known techniques including merely manually or mechanically uniformly distributing the fibers on a surface of a mold. For commercial production, however, the felt will customarily be prepared using a water slurry of the chopped fiber. When using a water slurry the chopped fiber may be ultrasonically dispersed in water. The fiber is allowed to settle onto a removable screen at the bottom of the container after dispersion and the screen is then withdrawn and the wet felt dried in an air oven at a temperature of 110° C. Alternatively, the water slurry of fiber may be subjected to suction filtration in a Buchner funnel with the felt forming on a Teflon coated glass filter paper. The felt formed on the filter paper will be dried in an air oven as discussed above. It may, in some cases, be desirable to add a wetting agent to the water to facilitate the felting step.

The dried felt is transferred to a mold, for example a graphite mold, and subjected to heat and pressure to form "paper." The temperature during the pressing step will be a function of the oxygen content of the stabilized fibers and for the broad range of 3 to 10% oxygen the temperature will be in the range of 160° to 350° C. For the preferred range of 4 to 8% oxygen, the applied temperature will be in the range of 180° to 270° C. The applied pressure will also be a function of the desired porosity, will be in the range of 50 to 1000 psi and will be inversely proportional to temperature for a given oxygen content. Upon completion of the molding step, the "paper" is symmetrically cooled to room temperature.

The final fabrication step, as noted above, is the carbonizing of the molded paper. The paper is pyrolyzed by heating in an argon atmosphere to 1000° C and/or 1260° C at a rate of 100° C per hour. To insure uniform heating, the samples being pyrolyzed will typically be placed between smooth graphite discs, the discs having surfaces which permit shrinkage without cracking of the end product, and embedded in a carbon powder pack. The samples undergo shrinkage during the pyrolyzation step and this fact must, of course, be taken into account in the design of the production equipment. Tests have shown that there is approximately an 11% shrinkage to 1000° C and 13% shrinkage to 1260° C.

In one reduction to practice of the invention, 13μ acrylic filaments, similar in composition to the product sold commercially under the trademark Acrylan, were obtained from the Monsanto Company. These filaments were stabilized in a continuous process by passing a yarn through a forced draft muffle maintained at a temperature of 215° C. The passage of the yarn through the muffle was regulated so that the yarn had total residence time at temperature of 4 hours. The stabilization treatment introduced approximately 9% by weight oxygen into the polymer. The stabilized yarn was then delivered to a cutting mill having 10 mil openings to produce shredded or chopped fiber. Weighed samples of the chopped fiber were uniformly distributed into a right cylindrical graphite mold and the mold was thereafter placed between the platens of a preheated press. The mold was pressurized to 50 psi and left in the press for 10 minutes, including mold warm up time, at a pressing temperature of 285° C. The molds were then removed from the heated press and placed on a aluminum plate and a second aluminum plate was placed on top of the mold to allow symmetrical cooling of the mold and sample to room temperature. The pressed discs from the molds were pyrolyzed by heating in a argon atmosphere to 1000° C and/or 1260° C at a rate of 100° C per hour. To insure uniform heating of the samples so as to preclude warpage during the firing, the samples were placed in graphite molds inside the pyrolysis furnace.

The porosity and bulk density, and to a lesser degree the specific gravity, of the end product have been found to be functions of the applied pressure during hot pressing. Thus, for a pressing temperature of 260° C, a pressure of 80 psi resulted in a porosity of 65%, a pressure of 160 psi resulted in a porosity of 52%, a pressure of 350 psi resulted in unacceptably low porosity of 38% and a pressure of 700 psi resulted in unacceptably low porosity of approximately 26%. The preferred range of porosity is, in part based on mechanical strength considerations, 55 to 65%. The mean open pore size and the bulk density of porous carbon "paper" made in accordance with the above described example vary with the porosity.

In a fuel cell electrolyte support plate application, the water expulsion characteristics determine the effectiveness of a porous plate to desorb and adsorb electrolyte on demand. The water expulsion characteristics, in percent of water expelled, vary with the operating pressure and, with a felted fibrillar carbon paper produced in accordance with the present invention the percent of water expulsion closely corresponds to that of currently used sintered nickle plates.

The resistivity of the self-bonded porous carbon "paper" of the present invention must also be controlled for the material to be suitable for fuel cell applications. The resistivity of the "paper" is controlled by the degree of carbonization which occurs during the pyrolysis step with the resistivity decreasing with higher temperatures. For material pyrolyzed at 1000° C, the resistivity varies directly with the percent of open porosity with a maximum resistivity of 0.028 ohm-cm corresponding to the 65% porosity. However, with a sample pyrolyzed at 1260° C, a resistivity of approximately 0.015 ohm-cm corresponds to 65% open porosity. It is necessary that the pyrolyzation be controlled to produce, in a "paper" having a thickness in the range of 15–20 mils, a lateral resistivity in the range of 0.01 to 0.05 ohm-cm.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A process for the manufacture of substrate material having a porosity in the range of 50% to 70% comprising the steps of:
    stabilizing a plurality of acrylic polymer filaments, said filaments containing at least 50% acrylonitrile, by heating in an oxidizing atmosphere until 3 to 10% by weight oxygen is introduced into the polymer;
    reducing the length of the stabilized filaments to form fibers having an average length commensurate with the desired substrate porosity;
    felting the fibers of reduced length to provide a layer of uniform thickness with random fiber orientation;
    subjecting the layer of fibers to heat and pressure in the range of 50–1000 psi to cause self-bonding of contiguous fibers whereby a sheet is formed without the aid of a binder for the felted fibers; and
    carbonizing the sheet by heating in a non-oxidizing atmosphere to produce a porous substrate material.

2. The method of claim 1 wherein the step of reducing the length of the stabilized filaments comprises:
    mechanically chopping the filaments into lengths commensurate with the desired substrate porosity.

3. The method of claim 1 wherein the substrate material has a thickness in the range of 15–20 mils and a lateral resistivity in the range of 0.01 to 0.05 ohm-cm. and wherein the step of felting comprises:
    distributing the fibers in a water slurry;
    collecting the distributed fibers from the slurry on a surface; and
    drying the collected fibers.

4. The method of claim 1 wherein the step of subjecting the layer of fibers to heat and pressure to form a sheet comprises:
    placing the layer of fibers in a mold;
    heating the mold to a temperature commensurate with the oxygen content of the stabilized filaments; and
    applying a pressure in the range of 50 to 1000 psi.

5. The method of claim 4 wherein the applied temperature is in the range of 160° to 350° C.

6. The method of claim 5 wherein the step of reducing the length of the stabilized filaments comprises:
    mechanically chopping the filaments into lengths commensurate with the desired substrate porosity.

7. The method of claim 6 wherein the substrate material has a thickness in the range of 15–20 mils and a lateral resistivity in the range of 0.01 to 0.05 ohm-cm. and wherein the step of felting comprises:
    distributing the fibers in a water slurry;
    collecting the distributed fibers from the slurry on a surface; and
    drying the collected fibers.

8. The method of claim 4 wherein the substrate has a porosity of 55 to 65%, a thickness in the range of 15–20 mils and a lateral resistivity in the range of 0.01 to 0.05 ohm-cm. and wherein the step of stabilizing comprises:
    heating the filaments in an oxidizing atmosphere until 4 to 8% by weight of oxygen is introduced into the polymer.

9. The method of claim 8 wherein the temperature applied during the formation of the sheet is in the range of 180° to 270° C.

10. The method of claim 4 wherein the step of carbonizing the sheet comprises:
    heating in an argon atmosphere to a temperature in the range of 1000° to 1260° C at a rate of 100° C per hour.

11. The method of claim 9 wherein the step of carbonizing the sheet comprises:
    heating in an argon atmosphere to a temperature in the range of 1000° to 1260° C at a rate of 100° C per hour.

12. The method of claim 11 wherein the step of reducing the length of the stabilized filaments comprises:
    mechanically chopping the filaments into lengths commensurate with the desired substrate porosity.

13. The method of claim 12 wherein the step of felting comprises:
    distributing the fibers in a water slurry;
    collecting the distributed fibers from the slurry on a surface; and
    drying the collected fibers.

* * * * *